May 10, 1966 E. V. CAVAGNERO 3,250,179
SLAB MILLING MACHINE

Filed May 25, 1964 9 Sheets-Sheet 1

INVENTOR.
ERMAN V. CAVAGNERO

BY McCormick, Paulding & Huber

ATTORNEYS

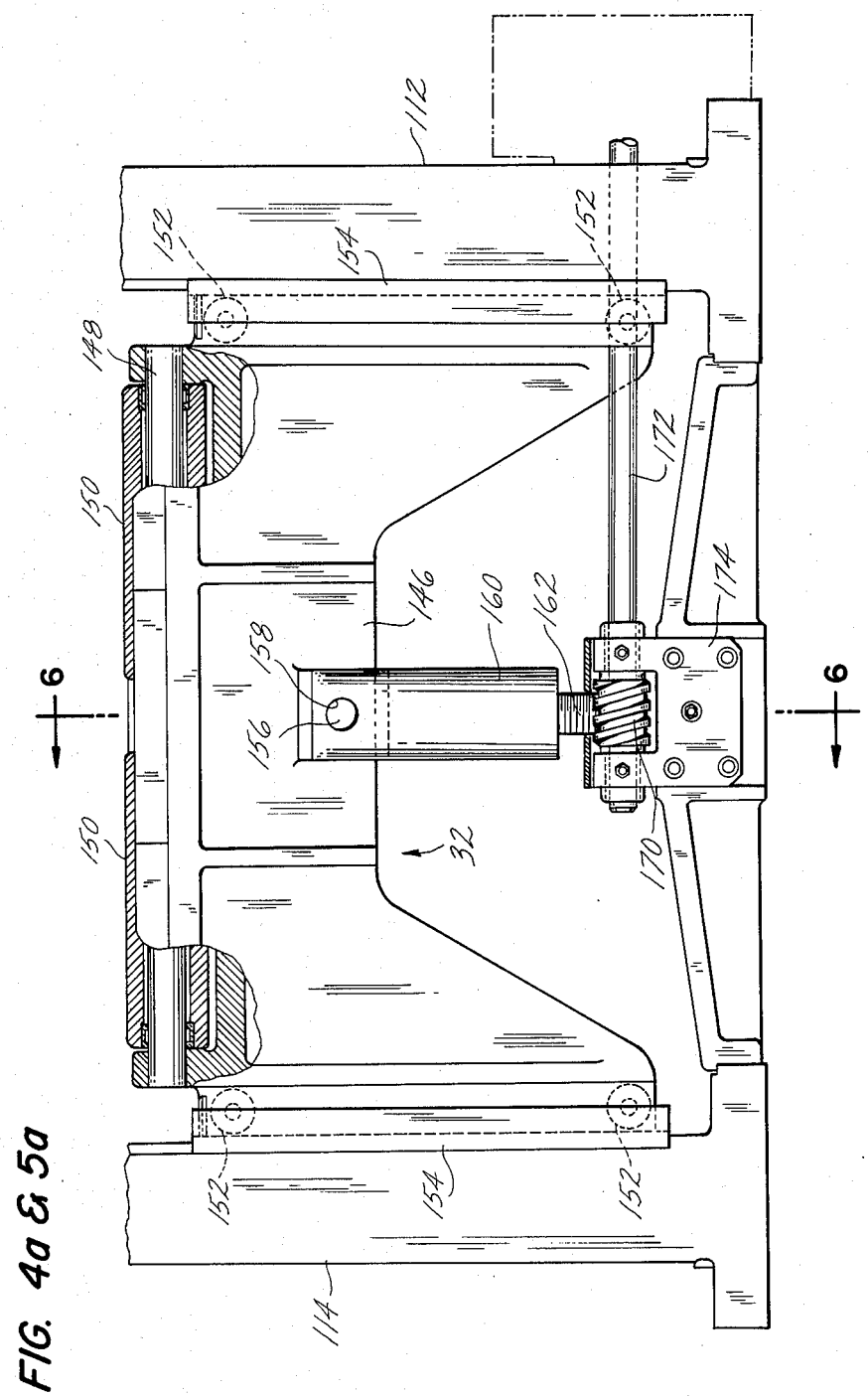

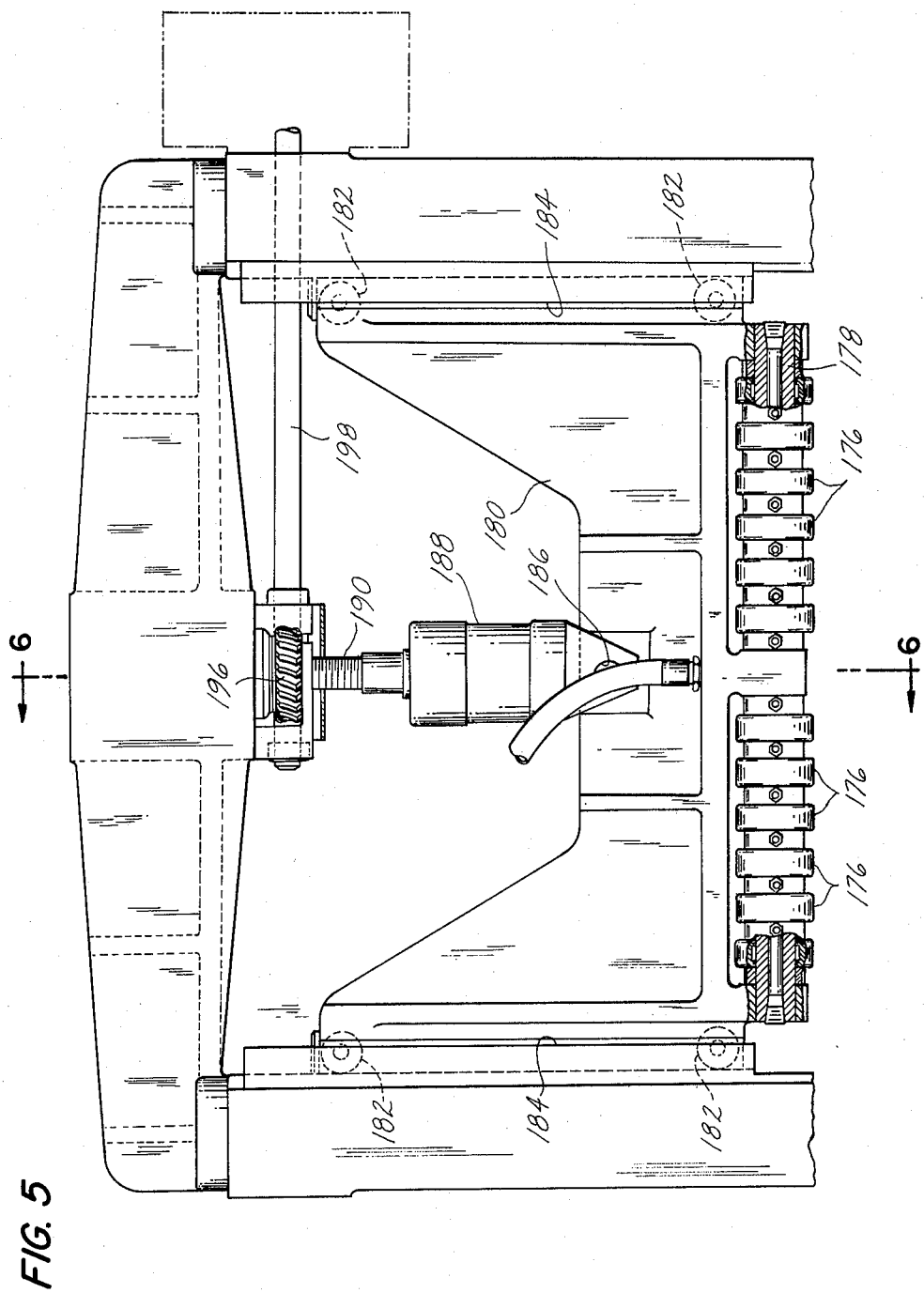

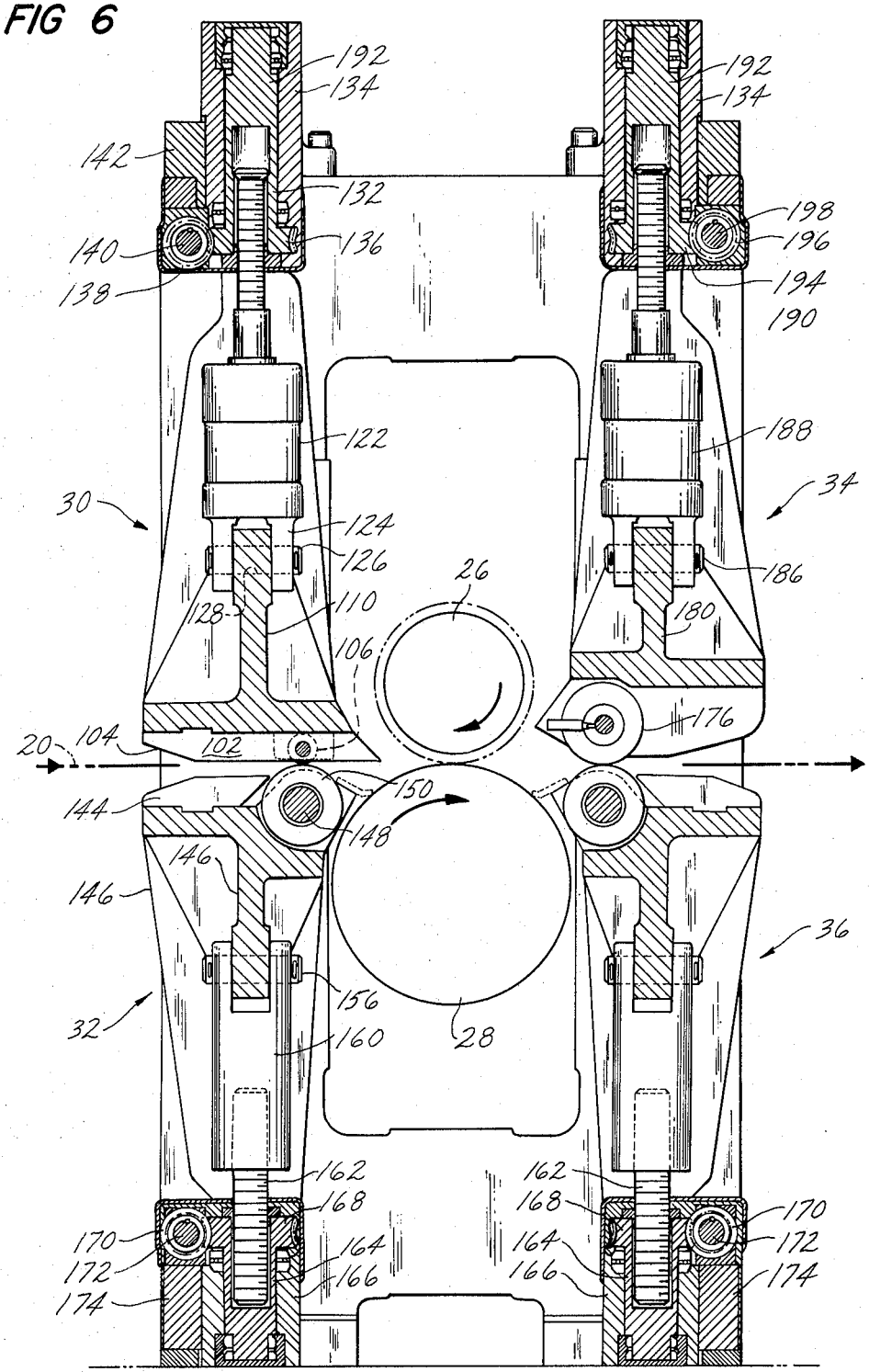

May 10, 1966   E. V. CAVAGNERO   3,250,179
SLAB MILLING MACHINE

Filed May 25, 1964   9 Sheets-Sheet 8 though the specification being relied upon for that purpose.

United States Patent Office 3,250,179
Patented May 10, 1966

3,250,179
SLAB MILLING MACHINE
Erman V. Cavagnero, Torrington, Conn., assignor to The Torrington Manufacturing Company, Torrington, Conn., a corporation of Connecticut
Filed May 25, 1964, Ser. No. 369,999
16 Claims. (Cl. 90—11)

This invention relates to slab milling machines of a type commonly found in brass mills between hot and cold rolling apparatus and which are adapted to remove casting imperfections and scale formed in hot rolling. The "slabs" handled by the machines are milled in continuous passage therethrough and are of substantial size and weight, for example, on the order of one-half inch thick, two feet in width, and extensive but indeterminate length as to weigh several tons. While copper and brass alloy slabs are conventionally handled by the machines, the present invention is not so limited.

The invention has as its general object, the provision of a slab milling machine adapted to provide a more precise control of the slab in the immediate area of the milling operation whereby to mill all slabs, and particularly comparatively thin slabs, more accurately and more efficiently than has heretofore been possible.

A further and more specific object of the invention resides in the provision of a highly efficient guide means and back-up roll arrangement, the guide means and back-up roll being engageable with a slab to securely and positively hold the same in proper engagement with a rotary cutter in movement of the slab past the cutter.

Another more specific object of the invention resides in the provision of adjustably supported cutter and back-up roll mounting means wherein threadably engageable parts are employed in said means and wherein biasing means maintain the threadably engageable parts in a preloaded condition in one direction even in the absence of a slab in engagement with the cutter and back-up roll.

Still another specific object of the invention resides in the provision of a releasable clamping means associated with bearings means for the cutter and back-up roll, the said means further contributing to the maintenance of the aforesaid precise control of the slab in the immediate area of the milling operation.

And a still further object of the invention resides in the provision of cutter and back-up roll visual position indicators adapted to simplify and yet insure highly accurate set-up operation of the cutter and back-up roll.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 4a and 5a is a single enlarged view showing the lower portions of both the left and right ends of the machine, said two machine portions being identical;

FIG. 5 is an enlarged right end view of the machine showing the upper portion thereof;

FIG. 6 is a vertical longitudinal section taken generally as indicated by the lines 6—6 in FIGS. 4, 4a and 5;

GENERAL ORGANIZATION

Figure 1:
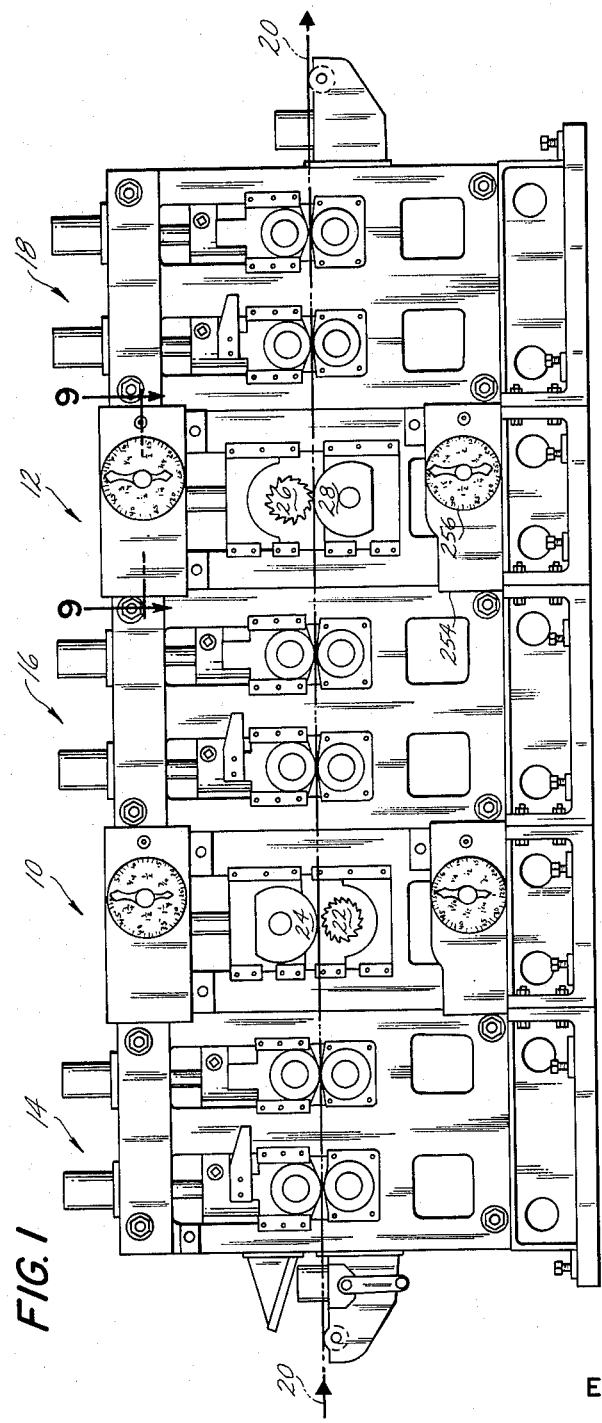
FIG. 1 is a somewhat schematic front elevation showing bottom and top milling machines each incorporating the present invention together with slab feed units conventionally associated with such milling machines.

Referring now particularly to FIG. 1, it will be seen that bottom and top milling machines are illustrated respectively at 10 and 12 in a line with first, second and third feed units 14, 16 and 18. The feed unit 14 is disposed adjacent the entry side of the bottom milling machine 10 for left to right-hand passage of a slab along the horizontal line 20. Thus, the feed unit 14 delivers the material to be milled to the bottom milling unit 10 from whence it passes to the feed unit 16 disposed between the bottom and top milling machines 10 and 12, the top milling machine 12, and the feed unit 18. The feed unit 18 passes the slab rightwardly for a further operation as for example upcoiling.

The slab may be delivered to the mechanism shown in the form of a coil having been passed through an upcoiler after hot rolling, or in the alternative, the slab may pass directly from a hot rolling mill to the mechanism shown. Similarly, on leaving the mechanism shown, the slab may pass to a cold rolling operation directly rather than the coiling operation mentioned above.

Considering the milling machines 10 and 12 in greater detail, it will be observed that the said units are substantially identical in construction. Differences in the machines 10 and 12 result from reversal of elements which is of course necessary due to the reversal of the cutter and back-up roll mechanisms indicated generally at 22–24 in the machine 10 and at 26, 28 in the machine 12. Guide assemblies to be described hereinbelow and which are associated with the cutter 22 in the bottom miller 10 are substantially identical with those to be described in association with the cutter 26 in the top milling machine 12. Similarly, the guide assemblies and other elements associated with the back-up roll 24 in the bottom miller 10 are substantially identical with those to be described for the back-up roll 28 in the top miller 12.

Figure 2:
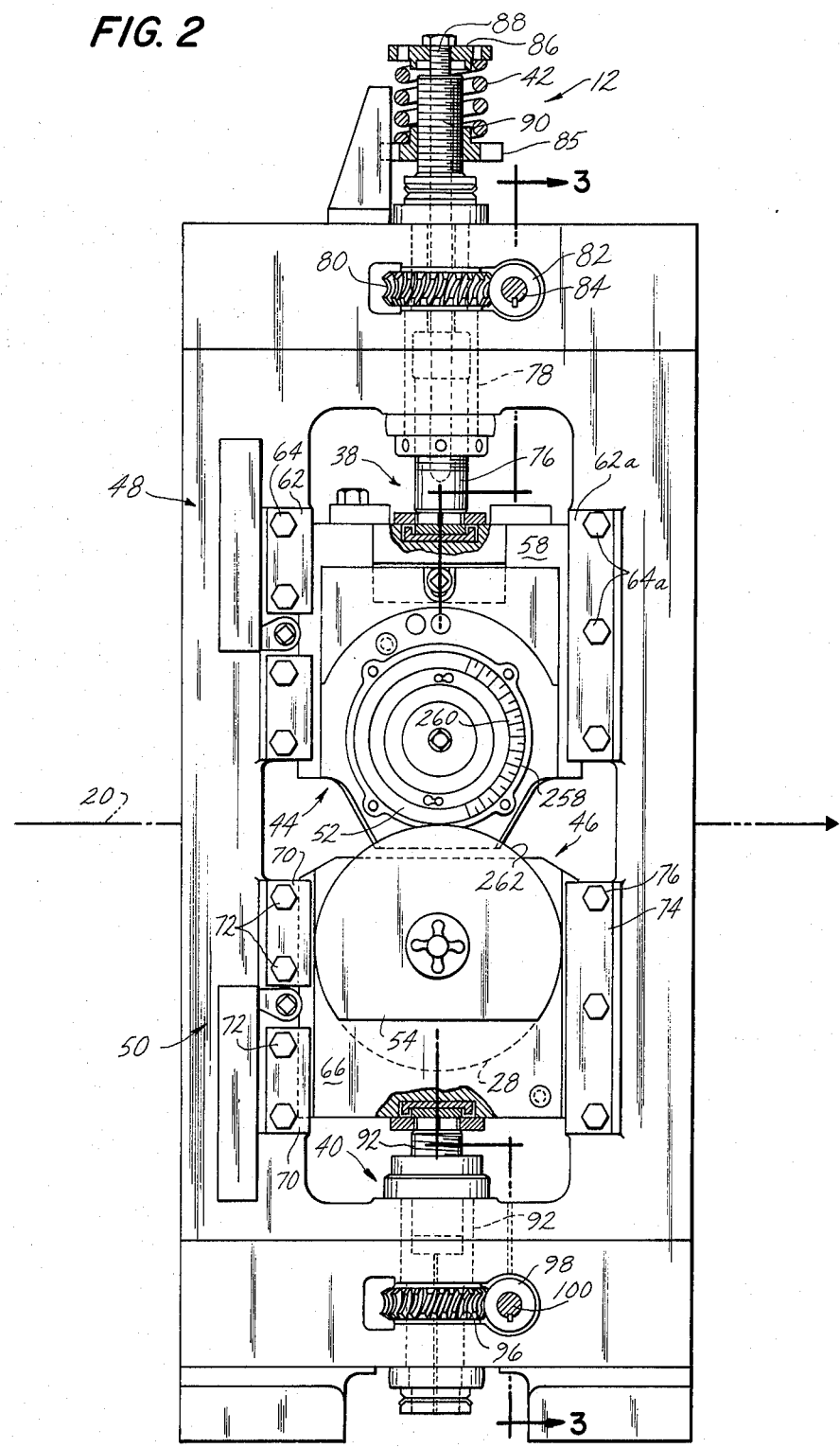
FIG. 2 is an enlarged front elevation of a top milling machine as shown in FIG. 1 but with certain parts removed for clarity.
Figure 3:
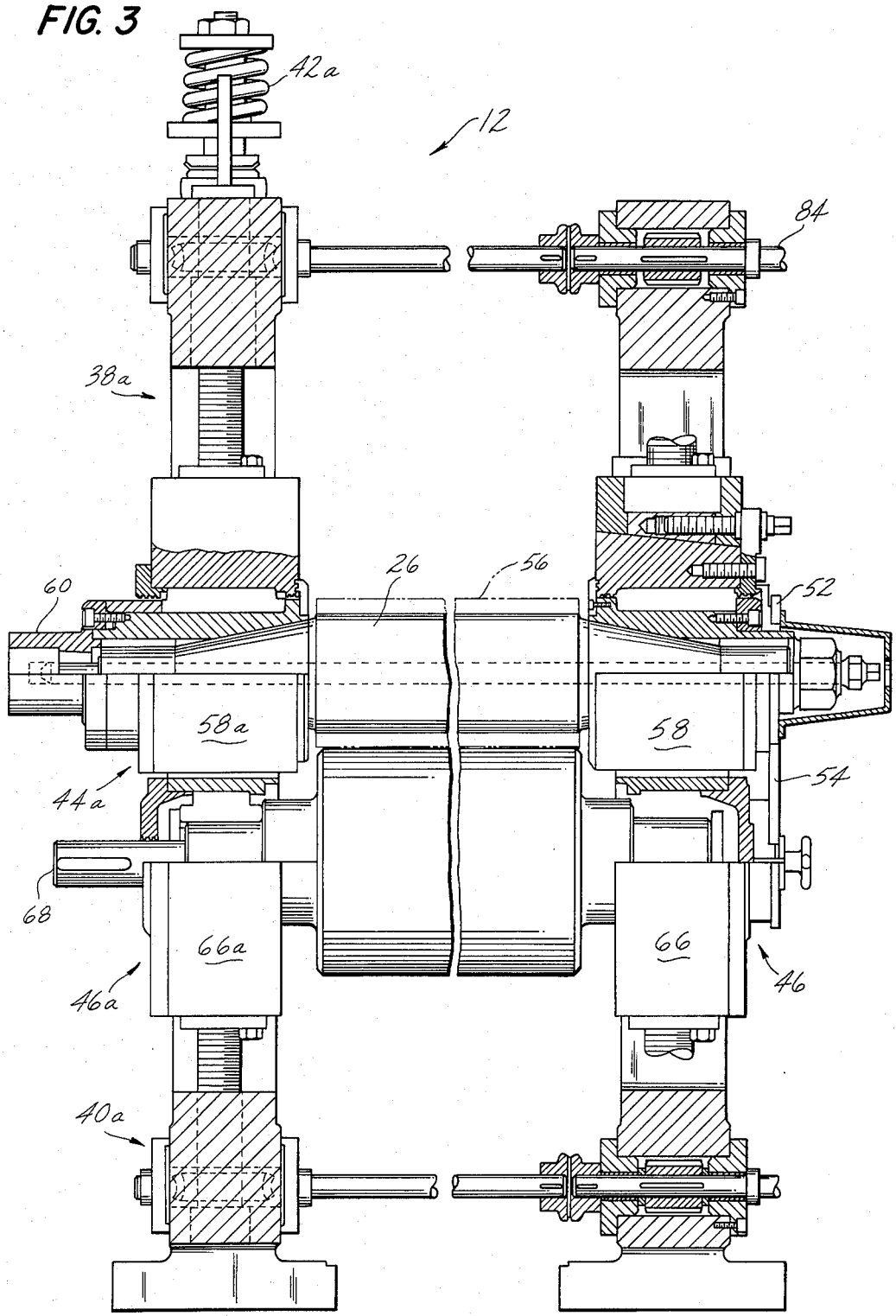
FIG. 3 is a vertical section taken generally as indicated at 3—3 in FIG. 2, with certain parts omitted for clarity.

Referring now to FIGS. 2 and 3 for a better illustration of the top milling machine 12, the cutter is clearly seen at 26 in cooperative relationship with the back-up roll 28. The slab passes from left to right as mentioned between and in engagement with the cutter and back-up roll and, as will be described more fully, the slab is bent slightly about the back-up roll by means of guide assemblies engageable with the slab. As best shown in FIG. 6, an entry guide means comprises upper and lower guide assemblies 30, 32 and exit guide means comprise upper and lower guide assemblies 34, 36. In fulfillment of the aforementioned general object of the invention, the guide assemblies, in cooperation with the back-up roll 28, maintain the slab in precise and proper engagement with the cutter whereby to provide for superior milling.

Adjustments of the cutter 26 and the back-up roll 28 in a vertical plane are provided for by means indicated generally at 38, 40 in FIG. 2. Said adjustment means are highly accurate so as to provide for precise set-up operations of the machine and the upper adjustment means 38 includes a biasing means comprising a spring 42. The spring 42 serves to maintain threadedly engageable parts in the adjustment means 38 in a preloaded condition in one direction whereby to urge the cutter 26 upwardly even in the absence of a slab in engagement therewith. Thus, the accuracy of set-up operations on the machine is further enhanced.

Still referring to FIG. 2, it will be observed that bearing means are shown respectively at 44 and 46 for the cutter 26 and the back-up roll 28. The said bearing means are vertically adjustable as mentioned above and there is included with each of the bearing means a clamping device adapted to securely hold the bearing means in adjusted position. Clamping devices are indicated generally at 48 and 50 for the bearing means 44 and 46 and will be described more fully hereinbelow. As will be apparent, clamping of the bearing means in adjusted position still further enhances the accuracy of set-up operations and the maintenance of the desired conditions after set-up.

Finally, visual position indicators are provided for the cutter 26 and the back-up roll 28 whereby still further to enhance the accuracy and ease of set-up operations on the machine. A position indicator 52 associated with the cutter 26 is best illustrated in FIG. 2 together with a position indicator 54 operatively associated with the back-up roll 28. The construction and mode of use of the indicators 52, 54 will be set forth in greater detail hereinbelow.

CUTTER AND BACK-UP ROLL

The cutter 26 is rotatable about a generally horizontal axis as best illustrated in FIGS. 2 and 3 and comprises a cylindrical member which, in the preferred form, is provided with a multitude of cutting inserts whereby to provide the cutting diameter 56 in FIG. 3. The cutting inserts and their method of construction and mounting form no part of the present invention and need not be shown and described herein. As mentioned, the cutter 26 is supported by the bearing means 44 at the front end of the machine shown in FIG. 2 and said means includes a bearing housing 58. A similar bearing means 44a is provided at the rear end of the machine together with a similar housing 58a. Reduced diameter end portions of the cutter are journaled within the housings in appropriate bearings and a left-hand end portion of the cutter is shown projecting rearwardly at 60. The said left-hand end portion 60 may be connected with a flexible coupling or the like for driving the cutter. With the slab passing from left to right as mentioned in FIG. 2, the cutter is rotated in a clockwise direction as indicated in FIG. 6.

Guide ways for the front bearing housing 58 are best illustrated in FIG. 2 at 62, 62a, the guideway 62 at the left being formed in two parts and held in position by suitable bolts 64, 64. The guideway 62a is preferably formed in a single piece and held in position by bolts 64a, 64a. Thus, the housing 58 in the front bearing means 44 is slidable vertically under the control of the aforementioned adjustment means 38. Similar guideways and adjustment means are provided for the rear housing 58a.

The back-up roll 28 is rotatable about a generally horizontal axis as shown and is preferably substantially larger than the cutter in diameter as illustrated. The aforementioned bearing means 46 has a corresponding bearing means 46a disposed at the rear side of the machine and each of said bearing means includes a bearing housing with appropriate bearings therewithin for receiving and rotatably supporting reduced diameter end portions of the back-up roll. The rear bearing housing is illustrated at 66a and the front bearing housing at 66. As will be observed, the rear bearing housing 66a provides for the rearward projection of an end portion 68 of the back-up roll end shaft. The said end portion 68 may be connected as by a flexible coupling with suitable drive means. When the slab of metal passes from left to right, as mentioned in FIG. 2, the back-up roll 28 is rotated in a clockwise direction as indicated in FIG. 6.

As with the bearing means 44, 44a, the bearing means 46, 46a are adapted for vertical sliding movement under the control of adjustment means. Guide plates 70 are formed in two parts and held in position by suitable bolts 72, 72 at the left of the front bearing housing 66 whereas a single guide plate 74 is shown at the right, being held in position by bolts 76, 76. Similar guide plates are provided for the rear bearing housing 66a.

Reverting now to the upper bearing means 44, 44a for the cutter 26, attention is invited to the adjustment means 38 comprising an externally threaded member 76, best illustrated in FIG. 2. The said member is fixedly connected with the bearing housing 58 so as to raise and lower the same and is received in internally threaded sleeve 78 connected with and rotated by a worm gear 80. The gear 80 is rotated in turn by a worm 82 on a shaft 84 which extends horizontally and transversely in the machine from front to rear to a rear adjustment means 38a for the bearing housing 58a. The adjustment means 38a need not be described as it is substantially identical with the adjustment means 38. As will be obvious, rotation of the shaft 84 in one and an opposite direction will result in rotation of the worm gear 80, the sleeve 78 and in raising and lowering of the threaded member 76 and the housing 58. Simultaneously and due to the connection of the rear adjustment means 38a with the shaft 84, the rear housing 58a will be correspondingly vertically adjusted.

As will be apparent, the adjustment means 38, 38a support substantial weight in the bearing housings 58, 58a and the cutter 26. With a slab in place in the machine, the cutter is urged upwardly but in the absence of a slab, this weight is supported by the threaded member 76 and its counterpart in the rear adjustment means 38a. Any play between the threads on the member 76 and the sleeve 78 will of course result in inaccuracy in set-up operations. To avoid this, the cutter and its bearing housings are held in an upper position at all times by means of the aforementioned biasing spring 42 and its counterpart in the rear adjustment means 38a. As will be observed, the spring 42 has an adjustable lower seat 85 and an upper seat 86 which is connected with a threaded stem 88. The stem 88 extends downwardly through a supporting member 90 and connects with the member 76 at its lower end portion. The said stem is slidably received within the member 90 and within the worm gear 80 so that the spring 42, in urging the seat 86 upwardly tends also to urge the threaded member 76 upwardly for the purpose set forth.

Adjustment of the back-up roll 28 in the vertical direction is accomplished by the aforementioned means 40 and a similar means 40a disposed at the rear of the machine. A threaded member 92 is received within an internally threaded sleeve 94 connected with and rotated by a worm gear 96. A worm 98 drives the worm gear 96 and is mounted upon a shaft 100 which extends rearwardly in the machine for similar operation of the rear adjustment means 40a. Thus, as in the case of the upper adjustment means 38 and 38a, the lower adjustment means 40 and 40a are adjusted in unison whereby to vertically adjust the position of the bearing housings 66 and 66a and thereby to adjust the vertical position of the back-up roll 28.

GUIDE MEANS

The guide means mentioned above are best illustrated in FIGS. 4, 4a, 5a, 5 and 6. Referring particularly to FIG. 6, the upper guide assembly 30 at the entry side of the cutter and backup roll 26, 28 will be seen to comprise a shoe 102 which extends generally horizontally across the machine and which has an inclined entry portion 104 adapted to direct a leading edge of a slab downwardly and beneath itself for proper engagement with the back-up roll and cutter. The shoe 102 has associated therewith a plurality of small rollers 106, 106 best illustrated in FIG. 4, and which are supported on a horizontally extending shaft 108 for engagement with a slab passing therebeneath. Both the shoe 102 and the roller and shaft combination are supported by a vertically movable carriage 110. The carriage 110 extends transversely between front and rear machine frame members 112 and 114 and preferably carries small rollers 116, 116 engageable with front and rear guide ways 118, 118 formed between guide plates 120, 120.

Figure 4:
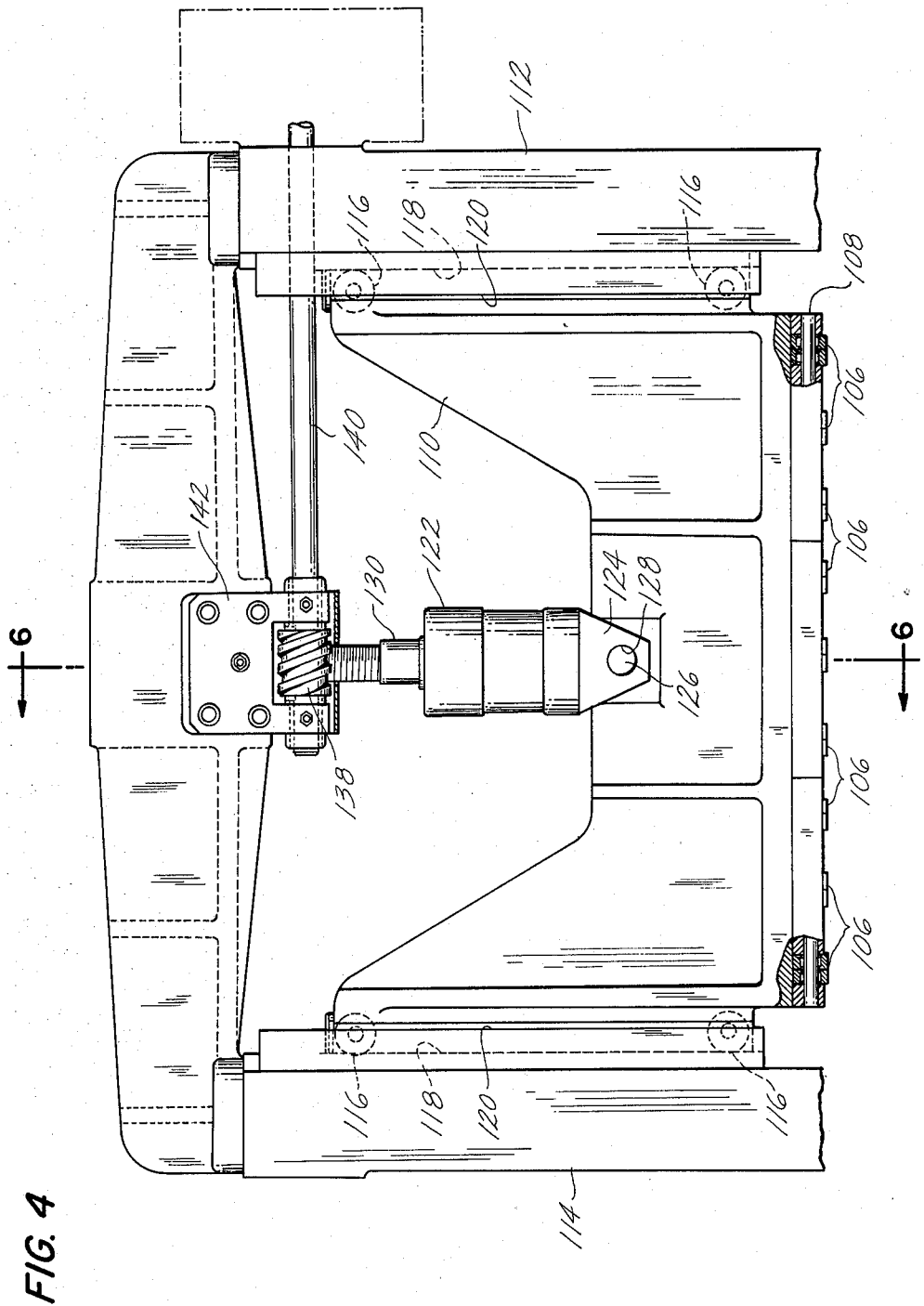
FIG. 4 is an enlarged left-end view of an upper portion of the top milling machine.

A hydraulic cylinder 122 is connected with the carriage 110 by means of a bifurcated cylinder end portion 124 and a pivot pin 126 extending through an opening 128 in the carriage. Thus, the carriage may pivot slightly to accommodate and conform to the upper surface of a slab therebeneath. A rod 130 operatively connected with the hydraulic cylinder 122 extends upwardly therefrom and has a threaded end portion entered within a sleeve 132 rotatably supported within a housing member 134, best illustrated in FIG. 6. The sleeve 132 is threaded internally and carried a worm gear 136 at a lower end portion thereof. The worm gear 136 is rotated by a worm 138 whereby to rotate the sleeve 132 and to raise or lower the rod 130. As best shown in FIG. 4, the worm 138 is carried by a transversely extending shaft 140, both supported in an upper machine frame member 142.

From the foregoing, it will be apparent that the entire assembly comprising the shoe 102, rollers 106, 106, carriage 110 and the cylinder 122 can be adjusted vertically to a selected operative position by rotation of the shaft 140. Operation of the hydraulic cylinder by appropriate valve means etc., not shown, will serve to move the said assembly to the said selected position and upwardly therefrom to an inoperative position.

Referring now particularly to FIGS. 4a and 5a and to FIG. 6, it will be observed that the lower entry guide assembly 32 comprises a shoe 144 similar to the shoe 102. There is also provided on a vertically movable carriage 146, a shaft 148 and first and second rollers 150, 150, best shown in FIGS. 4a and 5a. The shaft 148 extends transversely and substantially horizontally so as to provide for engagement of the rollers 150, 150 with the underside of a slab passing from left to right through the milling machine.

The carriage 146 is adjustable vertically and includes small rollers 152, 152 which cooperate with guide plates 154, 154. A pivot pin 156 extends through a suitable opening 158 in the carriage 146 and connects the same with a heavy link 160 connected in turn with a threaded stem 162 of reduced diameter. The link 160 occupies the position of the cylinder 122 described above.

As will be seen clearly in FIG. 6, the threaded stem 162 is received within a rotatable sleeve 164 supported in a housing 166. The sleeve 164 is threaded internally and has a worm gear 168 connected therewith and driven by a worm 170 on a shaft 172. Reverting to FIGS. 4a and 5a, the shaft 172 extends transversely through the front frame member 112 and is supported by a lower frame means 174. As will be obvious, rotation of the shaft 172 in one and an opposite direction will result in driving engagement of the worm 170 with the worm gear 168, in turn rotating the sleeve 164 and raising and lowering the stem 162 together with the parts borne thereby, these including the link 160, carriage 146, shoe 144, and the rollers 150, 150. As will be further apparent, the lower entry guide assembly 32 is adjustable to a selected operative position and thereafter remains in the said position, there being no provision for rapidly moving the same to an inoperative position as in the case of the upper guide assembly 30.

The lower exit guide assembly 36 is identical with the lower entry guide assembly 32 and need not be further described nor illustrated, FIGS. 4a and 5a being intended to illustrate both the entry and exit guide assemblies. Hereafter, and for clarity, when parts of these guide assemblies are referred to, the reference numerals of FIGS. 4a and 5a will be employed but the parts will be prefixed by the words "entry" or "exit."

The upper guide assembly 34 at the exit side of the cutter 26 and the back-up roll 28 includes a series of rollers 176, 176 best illustrated in FIG. 5. The rollers 176, 176 engage the upper surface of a slab passing through the machine and said rollers are carried upon a shaft 178 extending generally horizontally and transversely in the machine and supported at its ends by suitable brackets on a vertically movable carriage 180. The carriage 180 resembles the previously described carriages and includes the small rollers 182, 182 operatively associated with the guide plates 184, 184 on the machine frame. A pivot pin 186 connects the carriage 180 with a hydraulic cylinder 188 similar to the aforedescribed cylinder 122. A threaded piston rod 190 extends upwardly from the cylinder 188 and is entered in a rotatably supported sleeve 192 best illustrated in FIG. 6. The sleeve 192 is threaded internally for engagement with the threaded rod 190 and carries a worm gear 194 engageable with a worm 196 on a transverse shaft 198.

CLAMPING MEANS

Figure 7:
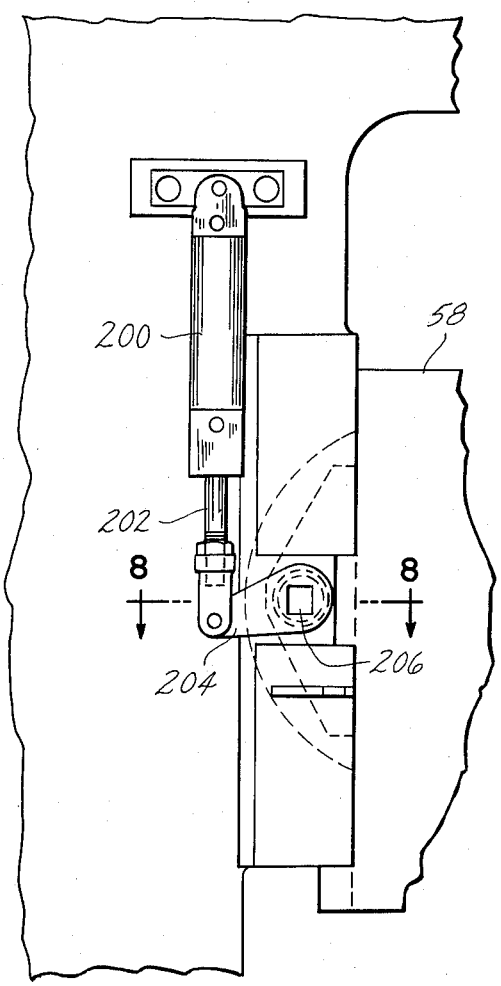
FIG. 7 is a further enlarged fragmentary front view of a portion of the top milling machine.
Figure 8:
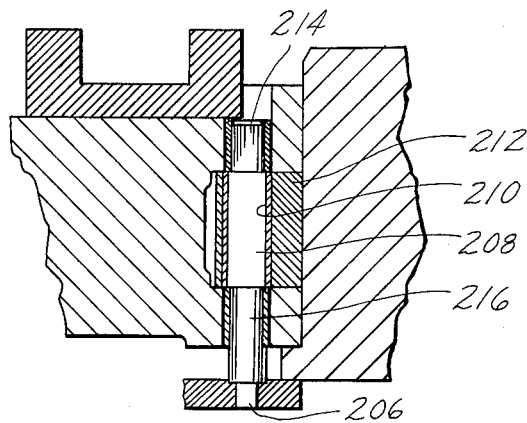
FIG. 8 is an enlarged sectional view taken generally as indicated at 8—8 in FIG. 7.

The clamping means 48 mentioned above is shown in greater detail in FIGS. 7 and 8, the cover shown in FIG. 2 having been removed. The clamping means 50 may be identical with the means 48 to be described.

A small hydraulic cylinder 200 is shown mounted upon the front face of the machine with its rod 202 connected with a link 204 extending to a square-end portion 206 of a clamping element. The clamping element 206 includes an eccentric 208 which is rotatable within a bushing 210 disposed within a clamp 212. End portions 214, 216 of the clamping element are journalled in the machine frame. The clamp 212 engages the upper bearing housing 58 mentioned above and frictionally secures the same in adjusted position or, alternatively, releases the housing for vertical adjustment as described. As will be apparent, the eccentric 208 will cause the clamp 212 to move into and out of frictional engagement with the housing as the element 206 is rotated by the hydraulic cylinder, its rod 202 and the link 204. A suitable control means is provided for the hydraulic cylinder 200 but forms no part of the invention and need not be illustrated or described here.

ADJUSTMENT OPERATING MEANS AND DIAL INDICATORS

Figure 9:
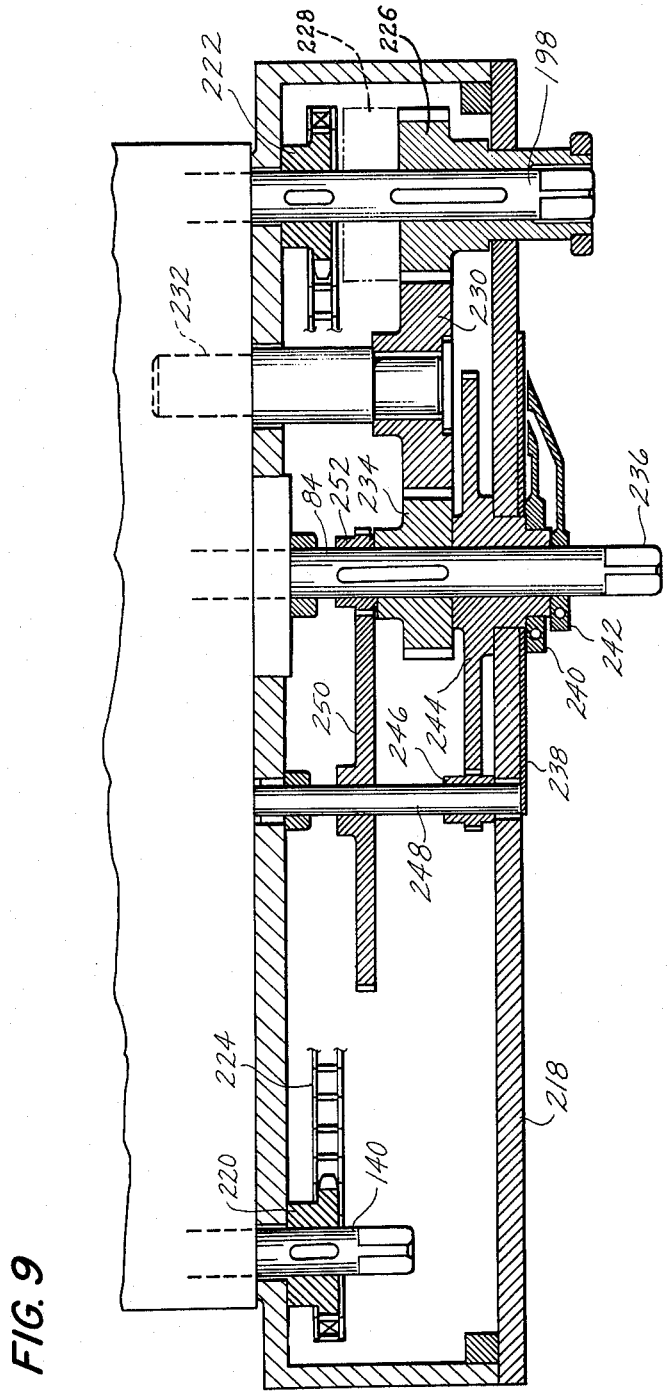
FIG. 9 is an enlarged horizontal sectional view taken generally as indicated at 9—9 in FIG. 1.

Referring particularly to FIGS. 1 and 9, it will be observed that the aforementioned adjustment shafts 84, 140, and 198 extend forwardly into a housing 218 at an upper portion of the machine. The shafts 140 and 198 are interconnected by means of sprockets 220, 222 and a chain 224 for rotation in unison and the shaft 198 has a gear 226 slidably mounted thereon. The gear 226 is movable to a rearward position at 228 wherein it is disengaged from a gear 230 and inoperative. In this rearward position of the gear 226, the shaft 198 can be rotated whereby to rotate the two shafts 140 and 198 in unison and to raise and lower the aforementioned upper entry and exit guide assemblies 30 and 34. Thus, the said guide assemblies can be adjusted to selected positions in unison by the operating means for their associated adjustment means.

With the gear 226 in its forward and operative position as shown, it engages and drives the gear 230 mounted on a stub shaft 232. The gear 230 in turn drives a gear 234 on the shaft 84 whereby to rotate the said shaft and to provide for adjustment of the two upper guide assemblies 30 and 34 and the cutter 26 in unison. Rotation of the shaft 84 can also be effected by engaging a suitable tool at a front end portion 236 thereof. When this is accomplished, and with the aforesaid gear 226 in its rearward position, the cutter can be adjusted vertically independently of the two upper guide assemblies 30 and 34.

Dial indicator means is preferably also provided and mounted upon the front of the housing 218 as best illustrated in FIG. 1 at 238. The dial 238 has first and second indicators 240 and 242 associated therewith and operated respectively by the shaft 236 and by a gear 244. The gear 244 is driven by a gear 246 mounted upon a stub shaft 248 which is driven in turn by a gear 250. The gear 250 is driven by a small gear 252 mounted upon the shaft 236, whereby to provide the required ratio for movement of the two indicators 240, 242 at different rates of movement as required by the selected scale graduations.

Referring again to FIG. 1, it will be observed that the top milling machine 12 has a housing 254 at the bottom and an associated dial 256. This housing may contain elements substantially identical with those described and shown in FIG. 9. The said elements can be connected with the aforementioned shafts 100, 172 and the shaft 172 in the lower guide assembly 136 at the exit side of the cutter and back-up roll. Thus, the guide assemblies 32 and 36 and the back-up roll 28 can be adjusted in a manner similar to that mentioned above for the cutter 26 and the guide assemblies 30, 34.

DISC-TYPE POSITION INDICATORS

The aforementioned position indicators 52, 54 provide for convenient set-up of the machine as with the use of gages therebetween. Preferably and as shown, the visual position indicator 52 for the cutter 26 is mounted upon the bearing housing 58. It is fixed against rotation with the cutter and is disposed on the cutter axis but is adjustable about said axis to provide for accuracy on grinding of the cutter inserts. Obviously the diameter of the cutter will be reduced on grinding and the disc 52 can be adjusted about the axis of the cutter so as to coincide at its periphery exactly with the ground diameter of the cutter. The disc 52 has an arcuate edge surface 258 on a range of radii which include a selected radius equal to the original radius of the cutter; and as shown, the said selected radius is the maximum radius of the disc. Preferably and as shown, a graduated scale 260 is provided along the arcuate edge 258 for ease in rotatably adjusting the disc as required to equal the diameter of the cutter 26. The disc 54 has a partially circular edge 262 and as shown, the edge is approximately three-quarters circular in extent or length.

OPERATION

Set-up operations of course precede the running operation of the machine and, as will be apparent from the foregoing, a high degree of efficiency and convenience is provided for in set-up of the machine of the present invention. The discs 52 and 54, constituting visual indicators for the cutter 26 and the back-up roll 28, may be employed with gages as mentioned to provide the exact space required between the said cutter and roll. Adjustment of the cutter and back-up roll with the dial indicators 238 and 256 assisting results in ease and convenience in set-up and in the maintenance of the precise conditions required for superior slab milling. Once the necessary adjustments have been made, the cutter and back-up roll can be clamped in position as mentioned by the clamping means 48 and 50 and the slab may be passed through the machine with the cylinders 122 and 188 in the upper guide assemblies 30, 34 in the condition wherein they hold the said guide assemblies in the downward and operative positions in engagement with the slab. During milling, a constant pressure is applied to the slab with the rollers of the lower guide assemblies 32, 36 acting in the nature of stops or abutments to prevent overbending of the slab. In a typical set-up, the rollers of the lower guide assemblies 32, 36 are adjusted to positions 1/32 of an inch below the upper surface of the back-up roll 28. Thus, a slight bend of the slab achieved and little or no vibration is encountered in the operation of the machine.

The absence of vibration in the operation of the machine, and the resulting superior milling, is believed to result largely from the four point guide system and the constant pressure means for securing the slab in proper position. The cylinders 122, 188 are here referred to and it is noted that the rollers 106 and 176 are pressed into engagement with the slab under the constant hydraulic pressure exerted by the cylinders to provide an extremely firm and close control of the slab.

In order to maintain the proper pressure during passage of a slab through the milling machine, it is noted that an "overset" condition of the rollers 106, 176 may be provided for initially. That is, the rollers may, for example, be set at 1/8-inch below the lower surface of the cutter 26 when the rollers 150, 150 are set 1/32 below the upper surface of the back-up roll 28. In operation, the rollers 106, 176 are urged upwardly from the set position by the slab and the constant pressure is exerted on the slab as mentioned.

With the guide means described and with the various means for setting and maintaining precise control of the slab in passage through the milling machine, slabs as thin as 1/4-inch have been successfully milled with a superior finish and at high speed. This is a substantial improvement over prior slab milling machines and results in a substantial economic advantage. Hot rolling is substantially less expensive than cold rolling of the slabs and the ability of the milling machine to handle relatively thin slabs permits a greater percentage of the required overall thickness reduction to be accomplished in hot rolling rather than in cold rolling.

The invention claimed is:

1. The combination in a slab milling machine or the like of a cutter rotatable about a generally horizontal axis, a back-up roll rotatable about a generally horizontal axis spaced vertically from the cutter axis to provide for the passage of a slab to be milled generally horizontally between and in engagement with the cutter and the back-up roll, power means for rotatably driving the cutter, entry and exit guide means disposed on horizontally opposite sides of the cutter and back-up roll and each comprising upper and lower guide assemblies disposed on vertically opposite sides of a slab passing between the cutter and back-up roll, each of said guide assemblies having a guide member engageable with a slab passing between the cutter and back-up roll and two of said guide assemblies disposed on the side of the slab adjacent the cutter and vertically opposite the back-up roll including fluid operable constant pressure resilient means urging the associated two guide members into engagement with the slab and bending the latter about the back-up roll.

2. The combination in a slab milling machine as set forth in claim 1 wherein said constant pressure resilient means includ etwo hydraulic cylinders connected respectively with said two guide members and urging the same into engagement with the slab under constant hydraulic pressure.

3. The combination in a slab milling machine as set forth in claim 2 wherein each of said guide members includes a slab engaging roll disposed for rotation about a horizontal axis.

4. The combination in a slab milling machine as set forth in claim 2 wherein said two guide assemblies include vertical adjustment means and associated operating means for vertical adjustment of the assemblies independently and in unison.

5. The combination in a slab milling machine as set forth in claim 4 and including a vertical adjustment means for said cutter and associated operating means connecting the same with the operating means for said two guide assemblies, said two operating means being so connected that the cutter can be adjusted vertically independently of and in unison with said two guide assemblies.

6. The combination in a slab milling machine as set forth in claim 5, and including position indicator means connected with said two operating means.

7. The combination in a slab milling machine as set forth in claim 6 wherein each of the remaining two guide assemblies and the back-up roll are provided with vertical adjustment means, and wherein there is provided an operating means for said adjustment means whereby the guide assemblies and the back-up roll can be adjusted independently and in unison.

8. The combination in a slab milling machine or the like of a cutter rotatable about a generally horizontal axis, a back-up roll rotatable about a generally horizontal axis spaced vertically from the cutter axis to provide for the passage of a slab to be milled generally horizontally between and in engagement with the cutter and the back-up roll, means supporting the cutter for vertical adjustment and means supporting the back-up roll for vertical adjustment, each of said support means having threadably engageable parts and the uppermost of said support means having a biasing spring associated therewith, said biasing spring serving to maintain the threadably engageable parts of the support means in a preloaded condition whereby to urge the associated cutter or back-up roll upwardly even in the absence of a slab in engagement therewith, power means for rotatably driving the cutter, and entry and exit guide means disposed on horizontally opposite sides of the cutter and back-up roll and each comprising upper and lower guide assemblies disposed on vertically opposite sides of a slab passing between the cutter and back-up roll, each of said guide assemblies having a guide member engageable with a slab passing between the cutter and back-up roll and said guide members being so located vertically with respect to the cutter and back-up roll that the slab is bent slightly about the back-up roll in passage through the guide means and the cutter and back-up roll.

9. The combination in a slab milling machine as set forth in claim 8 wherein the cutter is disposed above the slab and operatively associated with said uppermost support means.

10. The combination in a slab milling machine or the like of a cutter, bearing means supporting the cutter at opposite ends for rotation about a generally horizontal axis, means associated with each of said bearing means for vertically adjusting the cutter, releasable fluid operable clamping means associated with at least one of said bearing means for securing the same vertically against adjustment and unintended vertical movement, a back-up roll rotatable about a generally horizontal axis spaced vertically from the cutter axis to provide for the passage of a slab to be milled generally horizontally between and in engagement with the cutter and the back-up roll, power means for rotatably driving the cutter, entry and exit guide means disposed on horizontally opposite sides of the cutter and back-up roll and each comprising upper and lower guide assemblies disposed on vertically opposite sides of a slab passing between the cutter and back-up roll, each of said guide assemblies having a guide member engageable with a slab passing between the cutter and back-up roll and said guide members being so located vertically with respect to the cutter and back-up roll that the slab is bent slightly about the back-up roll in passage through the guide means and the cutter and back-up roll.

11. The combination in a slab milling machine or the like as set forth in claim 10 wherein each of said bearing means is provided with a releasable clamping means, and wherein said releasable clamping means each comprise a small hydraulic cylinder operatively connected with means frictionally engageable with the associated bearing means.

12. The combination in a slab milling machine or the like as set forth in claim 10 wherein said back-up roll is provided with bearing means, vertical adjustment means and clamping means substantially identical with and operable in the same manner as the aforesaid corresponding elements associated with the cutter.

13. The combination in a slab milling machine or the like of a cutter rotatable about a generally horizontal axis, a back-up roll rotatable about a generally horizontal axis spaced vertically from the cutter axis to provide for the passage of a slab to be milled generally horizontally between and in engagement with the cutter and the back-up roll, power means for rotatably driving the cutter, entry and exit guide means disposed on horizontally opposite sides of the cutter and back-up roll and each comprising upper and lower guide assemblies disposed on vertically opposite sides of a slab passing between the cutter and back-up roll, each of said guide assemblies having a guide member engageable with a slab passing between the cutter and back-up roll and said guide members being so located vertically with respect to the cutter and back-up roll that the slab is bent slightly about the back-up roll in passage through the guide means and the cutter and back-up roll, means for adjusting at least one of the elements comprising the cutter and back-up roll generally radially with respect to the other, cutter and back-up roll visual position indicators, and means for holding said indicators in adjacent positions where they are visually exposed from outside the machine and fixed respectively on the axes of the cutter and back-up roll, said cutter position indicator being adjustable angularly about the axis of the cutter and having an arcuate edge surface on a range of radii including a selected radius equal to the original radius of the cutter, and said back-up roll position indicator having at least a partially circular edge surface on a radius equal to that of the back-up roll.

14. The combination in a slab milling machine or the like as set forth in claim 13 which includes bearing means for the cutter and back-up roll, and wherein the position indicators are mounted respectively on the bearing means, the cutter position indicator being thus secured against rotation with the cutter but adapted for angular adjustment about the cutter axis, and the back-up roll being thus held against rotation with the said roll.

15. The combination in a slab milling machine or the like as set forth in claim 13 wherein said cutter position indicator includes a scale extending adjacent its said arcuate edge surface.

16. The combination in a slab milling machine or the like as set forth in claim 13 wherein said arcuate edge surface on said cutter position indicator includes a maximum radius equal to said selected radius and gradually decreases in radius therefrom.

References Cited by the Examiner

UNITED STATES PATENTS

| | | |
|---|---|---|
| 1,698,637 | 1/1929 | Kessler. |
| 2,071,619 | 2/1937 | Fiegel. |
| 2,327,531 | 8/1943 | Koch. |
| 2,820,402 | 1/1958 | Waenerlund. |

WILLIAM W. DYER, Jr., *Primary Examiner.*

G. A. DOST, *Assistant Examiner.*